(12) United States Patent
Bonn et al.

(10) Patent No.: US 6,239,409 B1
(45) Date of Patent: May 29, 2001

(54) HEATING DEVICE FOR HEATING A MOVEABLE PART OF AN AUTOMOBILE, ESPECIALLY A STEERING WHEEL HEATER

(75) Inventors: Helmut Bonn, Haibach; Michael Germuth-Löffler, Aschaffenburg, both of (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/462,999
(22) PCT Filed: Feb. 1, 1999
(86) PCT No.: PCT/EP99/00640
  § 371 Date: Jan. 14, 2000
  § 102(e) Date: Jan. 14, 2000
(87) PCT Pub. No.: WO99/39963
  PCT Pub. Date: Aug. 12, 1999

(30) Foreign Application Priority Data
  Feb. 4, 1998 (DE) .......................................... 298 02 579 U

(51) Int. Cl.[7] ....................................................... B60L 1/02
(52) U.S. Cl. ............................................. 219/204; 219/202
(58) Field of Search ................................... 219/200–204, 219/206, 207, 208, 209, 212

(56) References Cited

U.S. PATENT DOCUMENTS

| 2,392,539 | * | 1/1946 | Leible | 219/204 |
| 2,537,606 | | 1/1951 | Steppan | 219/204 |
| 2,652,476 | * | 9/1953 | Langiano | 219/204 |
| 2,835,777 | * | 5/1958 | Gates et al. | 219/204 |
| 3,165,620 | * | 1/1965 | Miller | 219/204 |
| 4,631,976 | * | 12/1986 | Noda et al. | 219/204 |
| 5,294,775 | * | 3/1994 | Carrier | 219/204 |

FOREIGN PATENT DOCUMENTS

| 91 14 936 | 12/1991 | (DE) . |
| 41 08 114 | 9/1992 | (DE) . |

OTHER PUBLICATIONS

English Summary of DE 4108114 and DE 9114936.3 (1 page).

\* cited by examiner

*Primary Examiner*—Tu Ba Hoang
(74) *Attorney, Agent, or Firm*—Christie, Parker & Hale, LLP

(57) ABSTRACT

The invention relates to a heating device for a moveable part of a motor vehicle such as an automobile which can be held, such as a steering wheel. The heater is connected to a source of electrical energy in a stationary part of the vehicle by a contact unit having a stator and a rotor. A voltage converter of the heating device is provided in the stationary part of the vehicle, before the contact unit or in the stator of the contact unit. The voltage converter enables the generation of a higher voltage than the normal 12 volt standard voltage of the vehicle.

21 Claims, 2 Drawing Sheets

HEATING DEVICE FOR HEATING A MOVEABLE PART OF AN AUTOMOBILE, ESPECIALLY A STEERING WHEEL HEATER

FIELD OF THE INVENTION

The invention relates to a heating device for heating a movable part of a motor vehicle, more particularly a steering wheel heater.

BACKGROUND OF THE INVENTION

It is known to heat parts of a vehicle which can be held, more particularly the steering wheel. For example, a steering wheel with an electric heater is known from DE 41 08 114 A1. There, a heat conductor made of copper wire is provided in the surface area of the steering wheel cover and is connected to a power supply device in the vehicle by a switch mechanism. In conjunction with a thermo-sensor, this serves to switch on the heater when required. From practice, it is known to operate the heater with a voltage of 12 volts and a current strength of 8 amps. As a result of this large current strength, it is standard practice to transfer the current from the battery through a contact unit with a slip ring/carbon brush to the steering wheel, because in the case of transfer by means of a strip conductor, the latter is no longer sufficiently flexible as a result of the minimum cross-section required, and because fewer conductors can be set in one contact unit and thus fewer consumers can be controlled.

SUMMARY OF THE INVENTION

The object of the invention is to supply the heating device with electric energy through a sufficiently flexible strip conductor having a cross-section such as is usual for supplying the remaining consumers in the steering wheel. The invention is a heating device for heating a movable part of a motor vehicle which can also be held, more particularly, a steering wheel heater which is connected through a contact unit having a stator and rotor to a source of electric energy in the stationary part of the vehicle. According to the invention, a voltage converter for the heating device is mounted in the stationary part of the vehicle in front of the contact unit or in the stator of the contact unit to generate a voltage which is higher than the standard 12 volt voltage in the vehicle. The voltage lies preferably between 35 and 50 volts and more preferably amounts to 48 volts.

By increasing the voltage, it is possible to reduce the current strength necessary to achieve a predetermined heating output, and it is also possible to use flat strip conductors having such small cross-sections that they are sufficiently flexible. Owing to the small cross sections, the number of flat strip conductors in the contact unit need not be reduced compared to an assembly without heater.

A DC/DC converter is preferably provided as the voltage converter.

It is furthermore expedient if the heating device is associated with control electronics having a temperature sensor for observing the predetermined maximum or minimum temperatures of the part which is to be heated.

DESCRIPTION OF THE DRAWINGS

The invention will now be explained with reference to one embodiment shown in the drawings in which.

DETAILED DESCRIPTION

Figure 1:
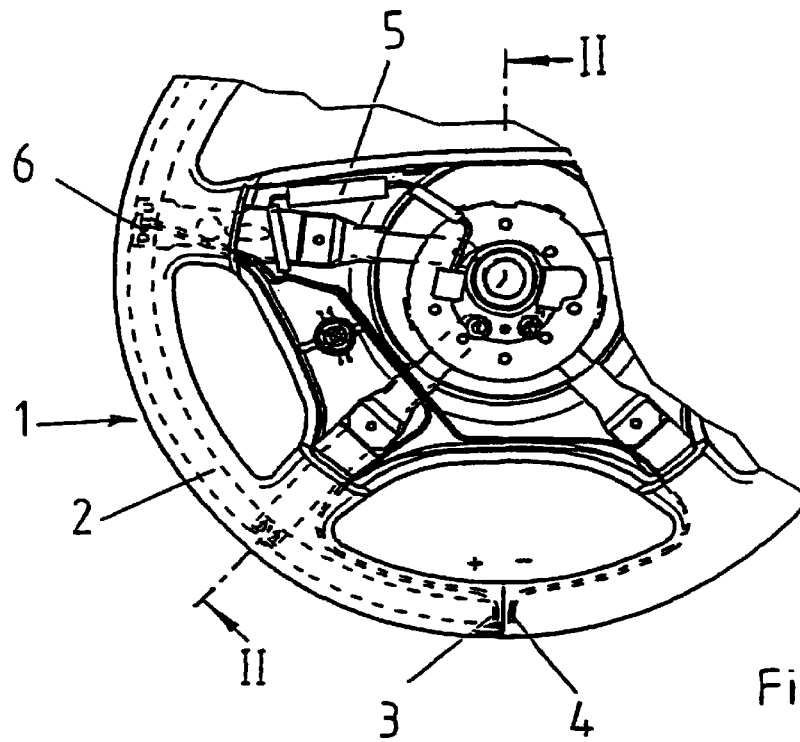
FIG. 1 is a plan view of a section of a steering wheel.
Figure 2:
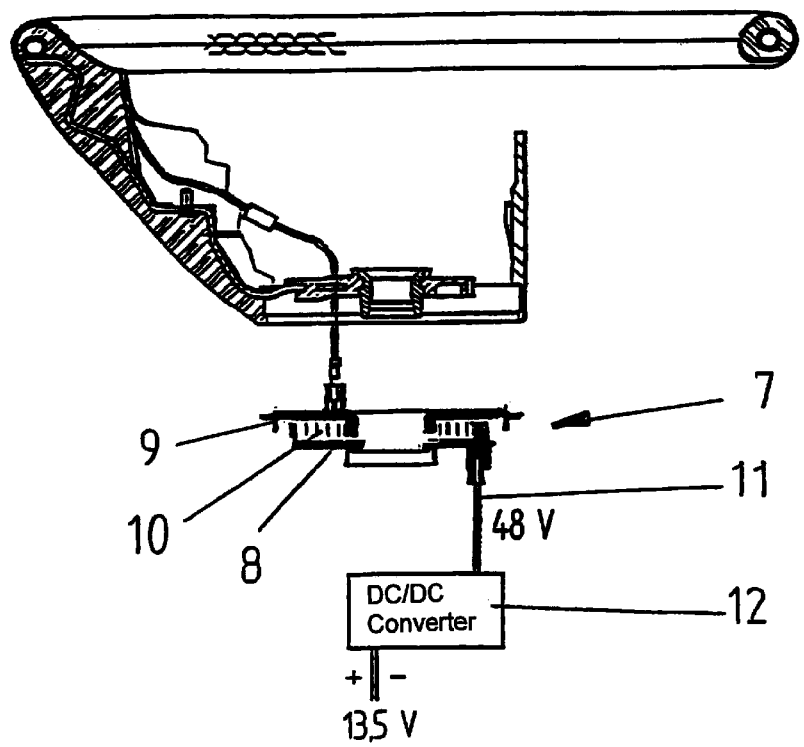
FIG. 2 is a section II—II along FIG. 1.
Figure 3:
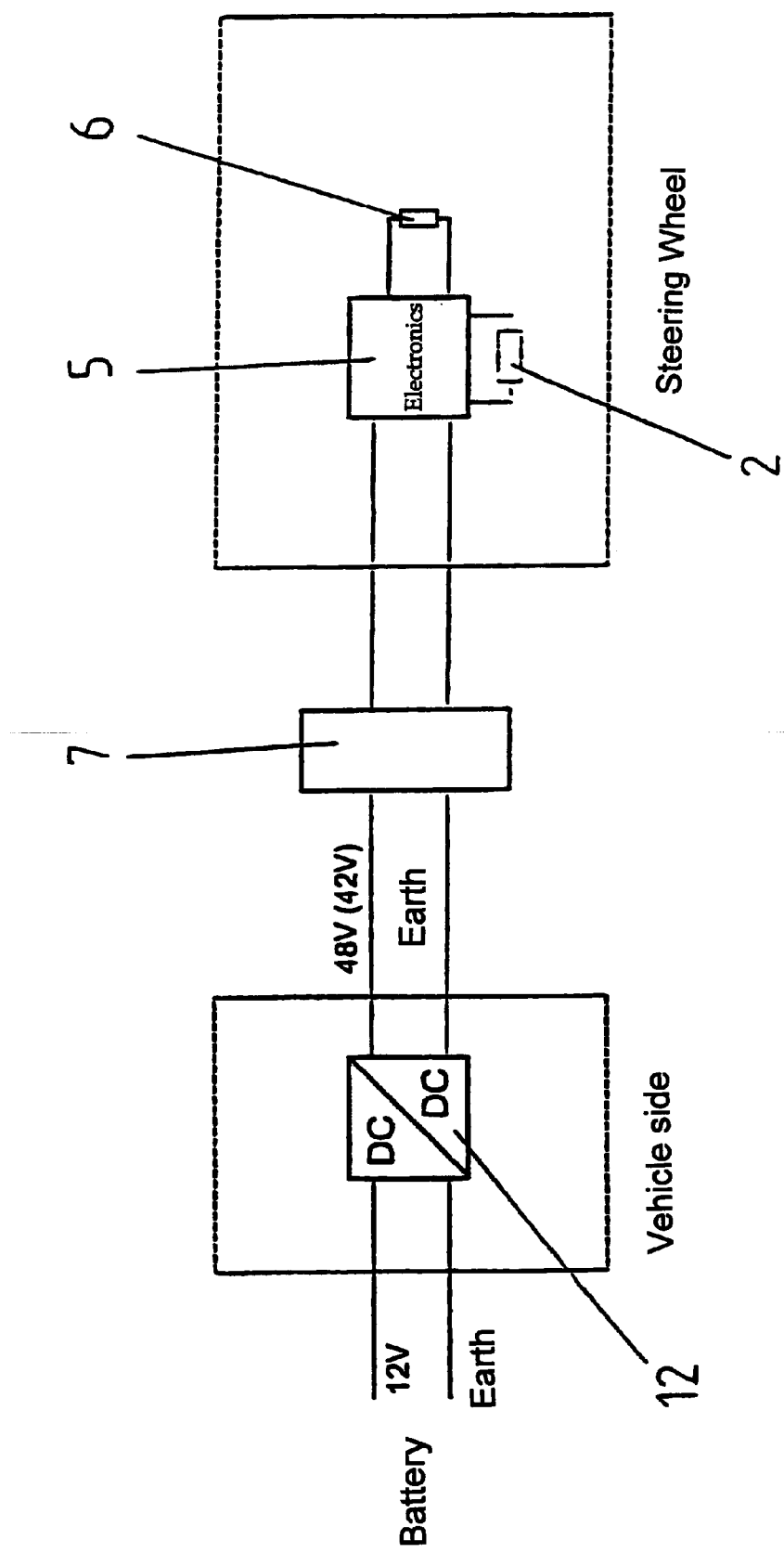
FIG. 3 is a block circuit diagram for a heating device.

A heating device 2 with connecting leads 3, 4 is provided in the cover of a steering wheel 1. The heating device is associated with control electronics 5 and a temperature sensor 6. The connecting leads 3, 4 are connected to the rotor 9 of a contact unit 7. Flat strip conductors 10 run in a known way between the rotor 9 and a stator 8.

A DC/DC converter 12 is mounted between the stator 8 and the stationary voltage source (not shown) which has a voltage of 12 to 13.5 volts at its output, with the output of the converter being connected to the stator 8 by a supply lead 11. The DC/DC converter 12 transforms the voltage to 48 volts. This exists at the input of the stator and allows the use of a flat strip conductor having a small cross-section, as is standard for supplying the remaining consumers in the steering wheel, which are operated with a voltage of 12 volts, to be used also for the heater.

What is claimed is:

1. A heating device for heating a movable part of a motor vehicle that has the movable part, a stationary part, and a source of electric energy including a motor vehicle battery in the stationary part of the vehicle, the heating device comprising:

a contact unit having a stator and a rotor;

a voltage converter located in the stationary part of the vehicle; and a heat conductor located in the movable part, wherein the heat conductor is connected to the source of electric energy through the contact unit and the voltage converter, and wherein the voltage converter generates a voltage higher than 12 volts.

2. A heating device according to claim 1 wherein the voltage generated is between 35 and 50 volts.

3. A heating device according to claim 1 wherein the voltage generated is 48 volts.

4. A heating device according to claim 1 wherein the voltage converter is a DC/DC converter.

5. A heating device according to claim 1 further comprising control electronics having a temperature sensor to detect a predetermined maximum or minimum temperature of the movable part to be heated.

6. The heating device of claim 1 wherein the movable part is a steering wheel.

7. The heating device of claim 1 further comprising strip conductors between the stator and the rotor, wherein voltage is passed through the contact unit by means of the strip conductors.

8. A heating assembly for a motor vehicle comprising:

a movable part configured to be held by an occupant of the vehicle and a stationary part, a source of electric energy including a motor vehicle battery in the stationary part, a contact unit having a stator connected to the stationary part and a rotor connected to the movable part, a heat conductor in the movable part connected to the source of electric energy in the stationary part of the vehicle through the contact unit and a voltage converter provided in the stationary part of the vehicle, located one of between the source of electric energy and the contact unit, and in the stator of the contact unit, wherein the voltage converter generates a voltage higher than 12 volts.

9. A heating assembly according to claim 8 wherein the voltage generated is between 35 and 50 volts.

10. A heating assembly according to claim 8 wherein the voltage generated is 48 volts.

11. A heating assembly according to claim 8 wherein the voltage converter is a DC/DC converter.

12. A heating assembly according to claim 8 further comprising control electronics having a temperature sensor to detect a predetermined maximum or minimum temperature of the movable part to be heated.

13. The heating assembly of claim 8 wherein the movable part is a steering wheel.

14. The heating assembly of claim 8 further comprising strip conductors between the stator and the rotor, wherein voltage is passed through the contact unit by means of the strip conductors.

15. A heating assembly for a motor vehicle, comprising:
- a movable part which can be held by an occupant of the vehicle and a stationary part,
- a source of electric energy including a motor vehicle battery in the stationary part having a specific voltage,
- a contact unit having a stator connected to the stationary part and a rotor connected to the movable part,
- a heat conductor in the movable part connected to the source of electric energy in the stationary part of the vehicle through the contact unit and
- a voltage converter provided in the stationary part of the vehicle, located one of between the source of electric energy and the contact unit, and in the stator of the contact unit, wherein the voltage converter generates a voltage higher than the specific voltage of the source of electric energy.

16. A heating assembly according to claim 15 wherein the voltage generated is between 35 and 50 volts.

17. A heating assembly according to claim 15 wherein the voltage converter is a DC/DC converter.

18. A heating assembly according to claim 15 further comprising control electronics having a temperature sensor to detect a predetermined maximum or minimum temperature of the movable part to be heated.

19. The heating assembly of claim 15 wherein the movable part is a steering wheel.

20. The heating assembly of claim 15 further comprising strip conductors between the stator and the rotor, wherein voltage is passed through the contact unit by means of the strip conductors.

21. The heating device of claim 1 wherein the voltage converter is located one of in front of the contact unit or in the stator of the contact unit.

* * * * *